March 11, 1952 P. A. NOXON 2,588,755
ATTITUDE INDICATOR
Filed Dec. 26, 1944 3 Sheets-Sheet 1
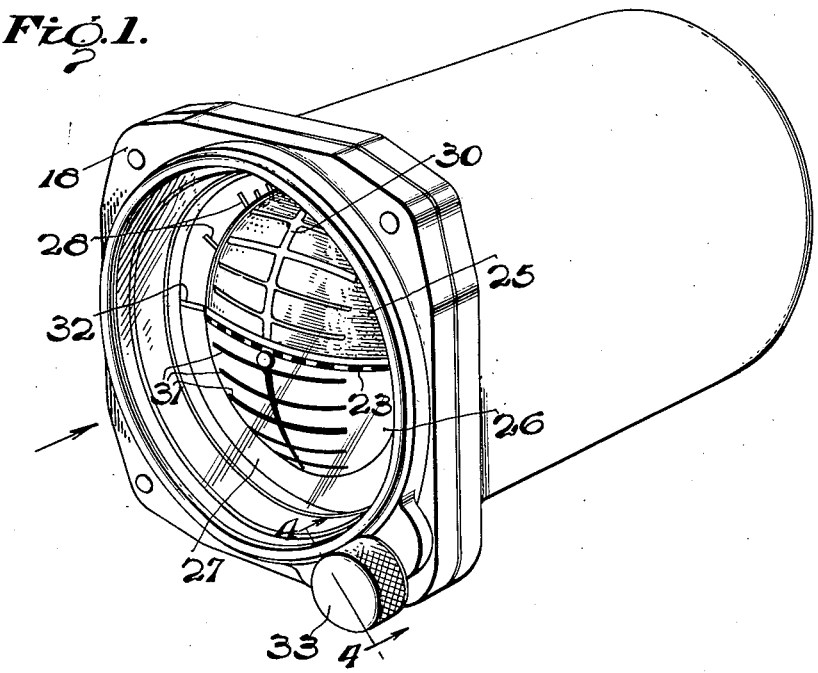
Fig.1.
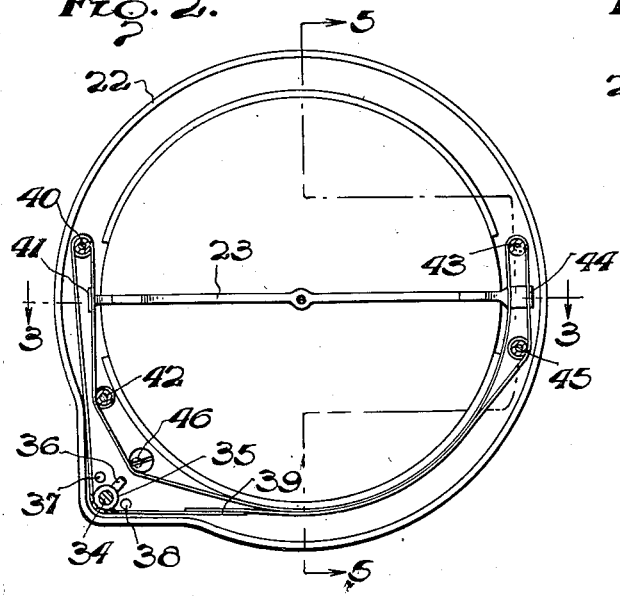
Fig.2.
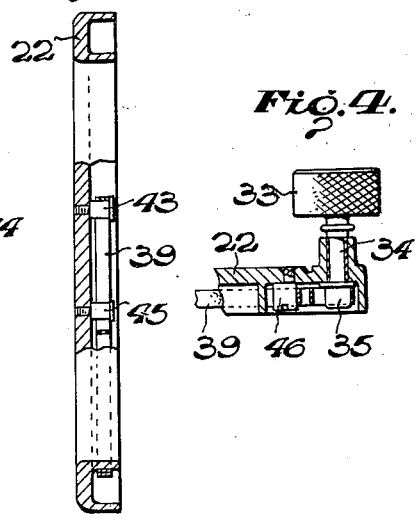
Fig.5.
Fig.4.
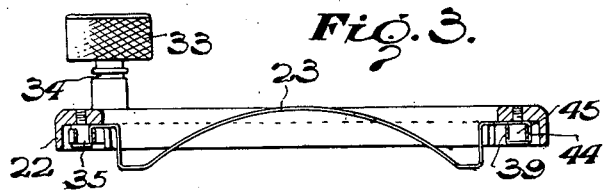
Fig.3.
INVENTOR.
Paul A. Noxon
BY
ATTORNEY March 11, 1952   P. A. NOXON   2,588,755
ATTITUDE INDICATOR
Filed Dec. 26, 1944   3 Sheets-Sheet 2
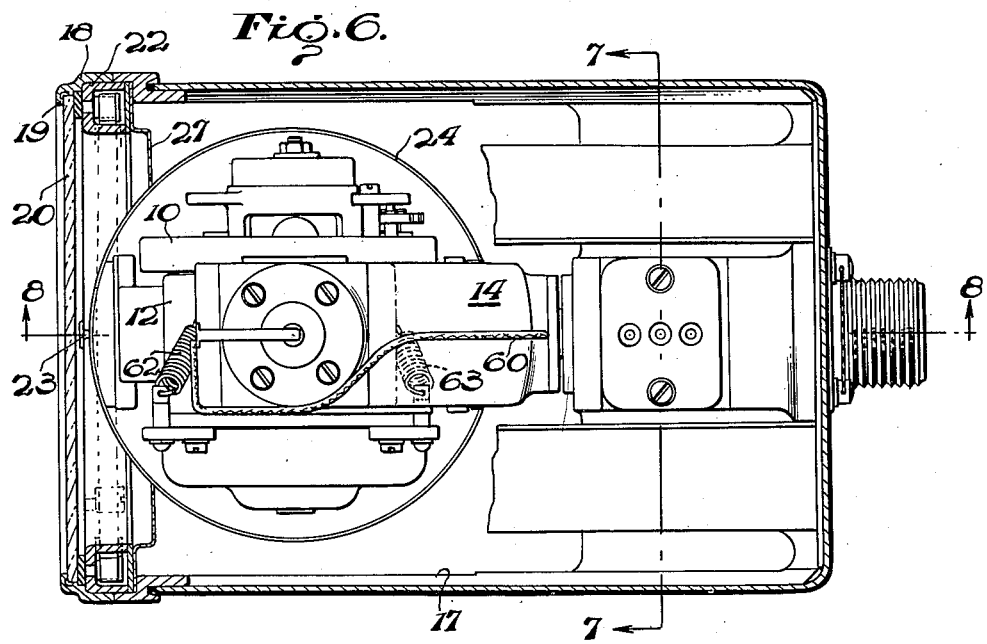
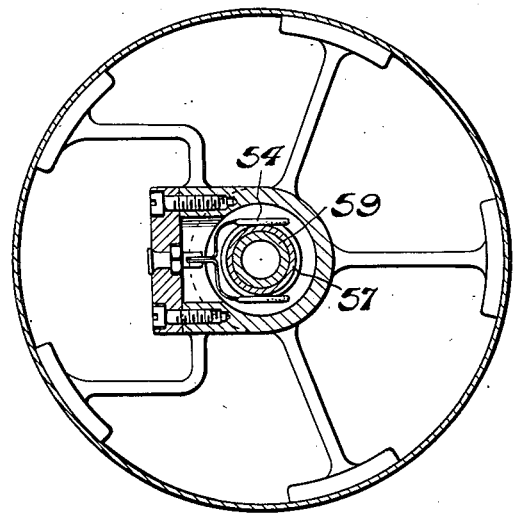
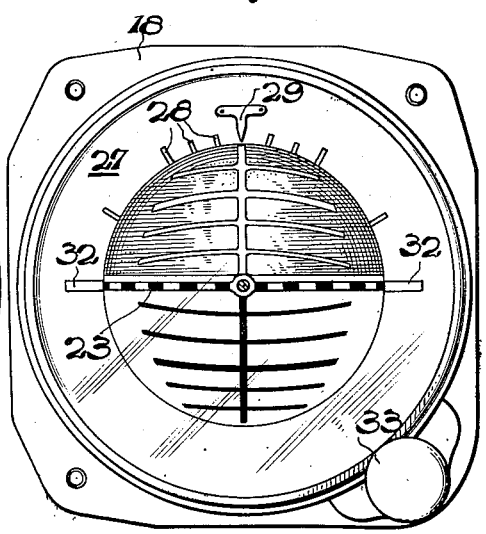
INVENTOR.
Paul A. Noxon.
BY
ATTORNEY

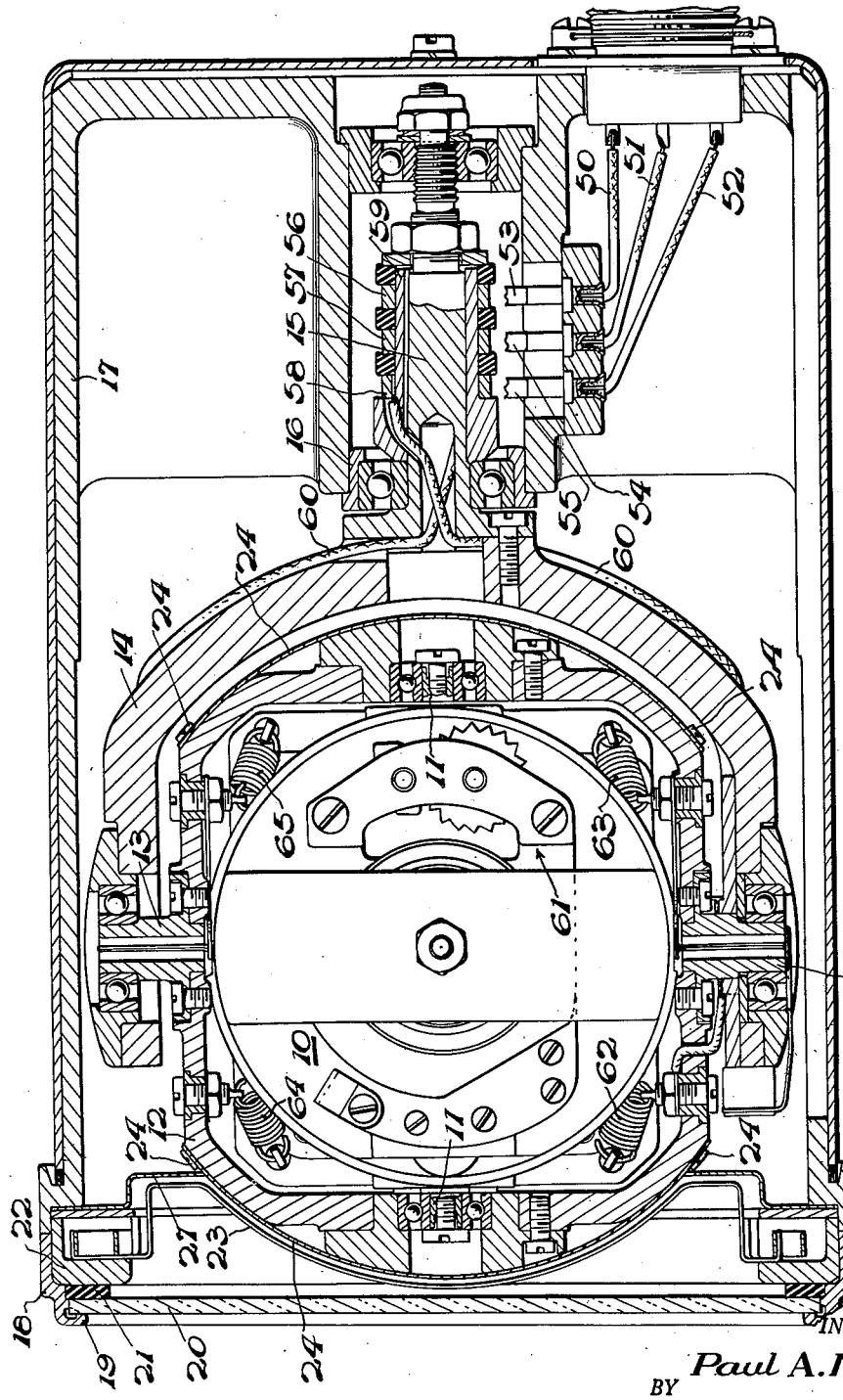

Patented Mar. 11, 1952

2,588,755

UNITED STATES PATENT OFFICE 2,588,755

ATTITUDE INDICATOR

Paul A. Noxon, Tenafly, N. J., assignor to Bendix Aviation Corporation, Teterboro, N. J., a corporation of Delaware Application December 26, 1944, Serial No. 569,748

4 Claims. (Cl. 74—5.2)

The present invention relates generally to gyroscopic devices of a non-tumbling character and more particularly constitutes a novel improvement over the nontumbling, free gyroscope of copending application Serial No. 569,747, filed December 26, 1944.

As is well known in the art, conventional artificial horizon gyroscopes are such that with any craft maneuver in which the nose of the craft becomes vertical such as a 90° climb or dive, for example, the gyroscope will pass through a point in which one of its three degrees of freedom is lost so that it will lock and, as a result of any bank component at that point, will tumble, such point being one wherein the fore and aft major trunnions of the gimbal align with the rotor spin axis.

It has been proposed in the above-referred to copending application to overcome the disadvantages surrounding conventional gyroscopic horizons by mounting the gyroscope with its three degrees of freedom within a separate gimbal pivotally arranged within the instrument about a normally fore and aft axis so that the rotor spin axis will be constantly maintained normal with one of the axes of freedom whereby the gyroscope will possess its three degrees of freedom at all times notwithstanding any and all acrobatic flying. The particular provision to this end constituted a motor drivably connected to the outer gimbal for displacing it angularly in either of two directions about a fore and aft axis in response to an electrical signal generated upon relative tilt of the rotor spin axis and one of the axes of freedom whereby the inner gimbal is carried by the outer gimbal about the fore and aft axis until its minor or athwartship trunnions become normal with the rotor spin axis.

The present invention contemplates broadly, as before, the maintenance of the athwartship or minor trunnions out of alignment with the rotor spin axis throughout all craft maneuvers so that the gyroscope will at all times maintain its three degrees of freedom without, however, the requirement for the driving motor, the amplifier, and the electrical take-off between the inner gimbal and the rotor. In place of the motor, the electrical take-off and the amplifier, simple and relatively light means are provided as compared with the relatively greater weight of the take-off, motor and amplifier.

An object of the present invention, therefore, is to provide a new and novel navigational instrument for use on mobile craft.

Another object of the invention is to provide a novel and improved non-tumbling, free gyroscope.

A further object is to provide a novel navigation instrument for use on aircraft whereby the pilot will be provided with continuous indications relative to a horizontal reference plane throughout all craft maneuvers.

Another object is to provide a novel artificial horizon gyroscope for aircraft which is adapted for full 360° freedom of response and indication about the roll and pitch axis of the craft.

A further object is to provide a novel non-tumbling, free gyroscope adapted for use as an artificial horizon on an aircraft with the use of which all requirement for a caging and locking mechanism has been eliminated.

Another and further object of the present invention is to provide a novel artificial horizon gyroscope of a non-tumbling character for use on aircraft which comprises a conventional three-degree-of-freedom gyroscope having its spin axis vertical and arranged with its minor gimbal trunnions fore and aft and its major gimbal trunnions athwartwise together with an outer yoke having a trunnion pivotally mounting the yoke about a fore and aft axis so that in effect the yoke trunnion becomes the gyro major trunnion while the major gimbal trunnions become the minor trunnions and the minor gimbal trunnions become the minor-minor trunnions. Furthermore, in addition to the mounting yoke, yieldable means are interposed between the gimbal and the rotor casing for constraining motion of the rotor relative to the gimbal.

A further object is to provide a novel three-degree-of-freedom gyroscope for use on aircraft which is adapted for always maintaining its freedom about all of its axes of oscillation and which is light in weight, simple in construction and requires a minimum number of parts thereby adapting it for ease in manufacture and maintenance.

Other and further objects and advantages of the invention will appear more fully hereinafter from a consideration of the detailed description which follows, taken together with the accompanying drawings. It is to be expressly understood, however, that the drawings are for the purpose of illustration only and are not designed as a definition of the limits of the invention.

In the drawings, wherein like reference characters refer to like parts throughout the several views, Figure 1 is a perspective view of an artificial horizon instrument embodying the subject matter of the present invention;

Figure 2 is a rear elevation view of a portion of the instrument of Figure 1 illustrating the load adjustment for the indicating bar thereof;

Figure 3 is a section view taken substantially along line 3—3 of Figure 2;

Figure 4 is a section view taken substantially along line 4—4 of Figure 1;

Figure 5 is a section view taken substantially along line 5—5 of Figure 2;

Figure 6 is a side elevation view in section of the instrument of Figure 1;

Figure 7 is a section view taken substantially along line 7—7 of Figure 6;

Figure 8 is a front elevation view of the instrument of Figure 6; and

Figure 9 is a top elevation view in section taken substantially along line 8—8 of Figure 6.

By the invention of the above-referred to copending application, a non-tumbling gyro is provided by making provision for maintaining a normal relation between the rotor spin axis and the athwartship axis of oscillation of the gyro so that the spin axis can never align with the athwartship axis of oscillation which condition, if permitted, would cause the gyro to precess and tumble in response to a pitch condition. By the present invention, on the other hand, the gyro rotor spin axis is permitted to align momentarily with the major axis of oscillation during a vertical pitch condition so that the gyro is permitted to precess but such precession is constrained and, therefore, not violent and is, moreover, limited to just so much as is required to move it out of alignment with the major or fore and aft axis whereby the gyroscope maintains at all times its three axes of freedom.

Referring now to Figure 9 of the drawings for a more detailed description, the novel gyroscope constituting the subject matter of the present invention comprises a rotor (not shown) provided with normally vertical spin axis mounted within a rotor casing 10. The casing, in turn, is supported by way of fore and aft minor-minor trunnions 11 within an intermediate gimbal 12 which is supported by way of minor athwartship trunnions 13 within a yoke or outer gimbal 14, the latter being mounted by way of a major fore and aft trunnion 15 within a bearing 16 secured within an instrument casing 17.

The open end of the casing is closed by a bezel 18 having a retainer flange 19 against which rests a transparent cover glass 20, a sealing ring 21 being arranged to rest against the cover glass. Interposed between the sealing ring and casing 17 is an annular member 22, shown in greater detail in Figures 2-5, inclusive, which adjustably supports therein an indicating bar member 23, the latter being adapted for cooperation with an indicating member 24 in the form of a sphere secured to gimbal 12 by way of screws 24. Bar 23 will thus simulate a part of the craft on which the instrument is mounted while the sphere 24 is adapted for up and down and lateral motion relative to the bar throughout 360° in bank and pitch.

Sphere 24, moreover, is provided with color contrasting sections such as, for example, an upper dark section 25 and a lower light section 26, the dark section extending rearwardly for 180° to be there joined by the light section which extends forwardly 180° to join the dark section at the front of the instrument as seen in Figure 1. In viewing the dark section the pilot must assume it to represent the ground and the light section as representing the sky, the line of juncture at the front of the instrument between the two sections defining the horizon reference against which bar 23 may be read during motion of casing 17 relative to sphere 24, the latter being stabilized by the gyro.

To assist in reading degrees of bank, furthermore, an annular scale 27 is fastened between casing 17 and annular member 22 to extend about the sphere and closely adjacent thereto with bank graduations 28, including a lubber line 29 thereon. The sphere 24, itself, is provided with a polar line 30, being light against dark section 25 and dark against light section 26 to facilitate readings of bank relative to graduations 28, such line extending completely around the circumference of the sphere. Extending from both sides of line 30 and spaced at 15° intervals are transverse lines 31, being of a light color against the dark section and of a dark color against the light section, these lines being arranged for 360° about the circumference of the sphere. Lines 31 including the juncture line between light and dark sections 25, 26 designate pitch relative to bar 23.

Bar 23 extends transversely of the stabilized sphere and is adapted for cooperation with two horizontal markers 32 on scale 27, the bar being preferably provided with alternate light and dark sections to facilitate its reading against either the dark or light sections 25, 26 of the sphere. It will now be apparent that for 360° of bank or pitch some part of the sphere will be visible from the front of the instrument.

In order to raise or lower bar 23 relative to the sphere to compensate for varying load conditions on the craft, a knob 33, accessible from the front of the instrument, is provided. The knob is fastened to a shaft 34 extending into member 22 and carrying thereon a toothed segment 35 having a lug 36 for engaging either of two limit stops 37 or 38 so that adjustment of the bar is limited to roughly 6° in either direction relative to markers 32. The knob is adapted for operating an endless tape 39, suitably perforated for receiving the teeth of segment 35, such tape being arranged upwardly about a pulley 40 and secured on its downward lap to the inner part of an extension 41 of bar 23, thereafter extending over pulleys 42, 43, the latter being arranged above the opposite end of the bar and secured on its downward lap to an extension 44 of the bar, over a pulley 45 and back to the toothed segment. An eccentric 46 is preferably provided for engaging the tape between pulleys 42 and 43 to the end that the tape may be pulled taut throughout its length. Thus, viewing the arrangement of Figure 2, a clockwise motion of shaft 34 by knob 33 will move the bar 23 downwardly while a counterclockwise motion of the shaft will move the bar upwardly.

This structure is described and claimed in application Serial No. 222,267 filed April 21, 1951 by the present inventor and assigned to the present assignee.

Although the gyro rotor may be driven pneumatically, it is shown, in the present instance as being driven electrically, the power therefor being fed from a suitable source of supply through leads 50, 51 and 52, which as shown in Figure 9, connect with suitable brushes 53, 54 and 55 engaging slip rings 56, 57 and 58 supported by an insulating sleeve 59 surrounding major trunnion 15. The slip rings connect in a conventional manner by way of conductors 60 with the rotor, such conductors being arranged along yoke 14, trunnions 13, inner gimbal 12 and trunnions 11. Since the gyro spin axis is subject to deviation from a normally vertical position due to bearing friction, acceleration, etc., an erecting mechanism, generally designated with the reference character 61, is provided, such system being of the type more fully described and claimed in U. S. Patent No. 2,159,118, issued May 23, 1939.

With the foregoing described arrangement, if the craft mounting the instrument were banked at substantially a 90° angle, it may be that due to bearing friction or other causes the yoke 14 would remain fixed with the casing 17 while the rotor casing had moved relative thereto so that minor trunnions 13 had aligned with the rotor spin axis whereby the gyro would become effectively locked about the pitch axis. If any pitch component were encountered at that point the gyro would tumble. In order to prevent tumbling, however, novel means are provided whereby the rotor spin axis will be maintained out of alignment with the minor trunnions 13 so that notwithstanding varying craft maneuvers the gyroscope will possess its three axes of freedom at all times.

To this end, therefore, that a novel non-tumbling, free gyroscope may be provided, resilient springs 62, 63, 64, and 65 are provided, each of which is anchored at one end to rotor casing 10 and to gimbal 12 at its other end. By virtue of such a provision, rotor freedom about one of the axes of oscillaion, i. e., minor-minor trunnions 11, is yieldably constrained and relative motion between rotor casing 10 and inner gimbal 12 restrained so that minor trunnions 13 can never align with the rotor spin axis. Moreover, when the axis of major trunnion 15 aligns with the rotor spin axis during vertical climb or dive and a bank component is introduced the gyroscope will tend to precess, as is the case with a conventional artificial horizon gyroscope, except that with the novel arrangement of the present invention, instead of tumbling, the gyroscope is permitted to precess a limited amount only sufficient to pass out of alignment with the axis of the major trunnion while the major part of the precessive torque works through springs 62, 63, 64, and 65 to re-orient minor trunnions 13 of gimbal 12 to become perpendicular with the rotor spin axis.

Stated in another manner, alignment between the major trunnion axis and the rotor spin axis is momentarily permitted so that the precessive force of the gyro thus developed is utilized to orient the inner gimbal into a position where its minor trunnions 13 become normal with the rotor spin axis and at the same time the rotor spin axis passes out of alignment with the major trunnion axis. Any limited deviation from a normally vertical position by the rotor spin axis is corrected by the erecting mechanism in the well known manner. In this manner, the novel gyroscope of the present invention retains all of its axes of freedom at all times to thereby accurately respond to and indicate 360° of bank and pitch and/or any combination thereof.

Where the arrangement of the above-referred to copending application provides a non-tumbling, free gyro by making provision for maintaining the rotor spin axis normal with the minor athwartship gyro trunnions, the present invention accomplishes the same purpose in a different and more simplified manner, i. e., alignment is momentarily permitted between the rotor spin axis and the major trunnion axis to develop a precessive force, the major portion of which is exerted on the springs to bring the minor athwartship trunnions into a normal relation with respect to the rotor spin axis.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art. For a definition of the limits of the invention, reference will be had primarily to the appended claims.

I claim:

1. In a gyroscope device having a rotor adapted to spin about a predetermined axis, first means for mounting said rotor for freedom about two mutually perpendicular axes other than said spin axis, second means mounted for pivoting about an axis normally aligned with one of said two mutually perpendicular axes and supporting said first means, and resilient means yieldingly restraining relative movement of said rotor spin axis and said first means and maintaining said rotor spin axis and said first means in a predetermined relationship with one another.

2. The combination with an artificial horizon gyroscope having a rotor provided with a normally vertical spin axis and means mounting said rotor for oscillation about two mutually perpendicular horizontal axes, of an outer gimbal pivotally mounted about an axis normally aligned with one of said horizontal axes for supporting said mounting means, and spring means yieldingly restraining movement of said rotor spin axis relative to said mounting means and being free of said gimbal and providing the sole means for restraining such movement.

3. In a navigational instrument a housing, a gyroscope within said housing having a casing, a rotor rotatably supported by said casing for spinning about one axis, a first gimbal for mounting said rotor for freedom about two mutually perpendicular axes other than said spin axis, a second gimbal rotatably mounted within said housing about an axis normally aligned with one of said two mutually perpendicular axes for supporting said first gimbal therein, and resilient means interconnecting said first gimbal and said rotor casing and providing the sole means for yieldingly restraining relative movement of said first gimbal and said rotor casing to maintain a predetermined relation between said first gimbal and said rotor spin axis.

4. An artificial horizon for aircraft, comprising a non-tumbling gyroscope having a rotor provided with a normally vertical spin axis, a gimbal supporting said rotor for freedom about two mutually perpendicular horizontal axes, and resilient means yieldingly restraining relative movement of said rotor spin axis and said gimbal and maintaining said rotor spin axis out of alignment with one of said two axes during stunt flying.

PAUL A. NOXON.

REFERENCES CITED

The following references are of record in the file of this patent:

UNITED STATES PATENTS

| Number | Name | Date |
|---|---|---|
| 1,598,871 | Otto | Sept. 7, 1926 |
| 2,127,959 | McKiernan | Aug. 23, 1938 |
| 2,333,984 | Carlson | Nov. 9, 1943 |
| 2,450,875 | Braddon et al. | Oct. 12, 1948 |

FOREIGN PATENTS

| Number | Country | Date |
|---|---|---|
| 617,576 | France | Nov. 22, 1926 |
| 636,829 | France | Jan. 16, 1928 |
| 819,858 | France | July 19, 1937 |
| 140,482 | Great Britain | Apr. 1, 1920 |

OTHER REFERENCES

Aircraft Engineering, pp. 288–289, October 1944.